(12) United States Patent
Morovic et al.

(10) Patent No.: US 10,853,711 B2
(45) Date of Patent: Dec. 1, 2020

(54) DISPENSING PROCESS

(71) Applicant: HEWLETT-PACKARD DEVELOPMENT COMPANY, L.P., Spring, TX (US)

(72) Inventors: Peter Morovic, San Cugat del Valles (ES); Jan Morovic, London (GB); Jordi Arnabat Benedicto, San Cugat del Valles (ES); Joan Vidal, San Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/327,718

(22) PCT Filed: Oct. 25, 2016

(86) PCT No.: PCT/US2016/058693
§ 371 (c)(1),
(2) Date: Feb. 22, 2019

(87) PCT Pub. No.: WO2018/080461
PCT Pub. Date: May 3, 2018

(65) Prior Publication Data
US 2019/0251405 A1    Aug. 15, 2019

(51) Int. Cl.
*G06K 15/00* (2006.01)
*G06K 15/02* (2006.01)
(Continued)

(52) U.S. Cl.
CPC .......... *G06K 15/186* (2013.01); *G06K 15/02* (2013.01); *G06K 15/1822* (2013.01);
(Continued)

(58) Field of Classification Search
None
See application file for complete search history.

(56) References Cited

U.S. PATENT DOCUMENTS 6,042,211 A   3/2000   Hudson et al.
6,081,344 A   6/2000   Bockman et al.
(Continued)

FOREIGN PATENT DOCUMENTS

EP    1139654       10/2001
EP    2842749 A1    3/2015
WO    WO-2015161895 A1   10/2015

OTHER PUBLICATIONS

Mese, M. et al, Look Up Table (LUT) Method for Image Halftoning, Apr. 27, 2009, <http://citeseerx.ist.psu.edu/viewdoc/download?doi=10.1.1.64.7986&rep=rep1&type=pdf>.

*Primary Examiner* — Dung D Tran
(74) *Attorney, Agent, or Firm* — HP Inc. Patent Department

(57) ABSTRACT

A method is described in which printing instructions representing printing content to be printed by a printing system are received, the printing system comprising a dispenser to dispense printing material. Whether to perform a first mapping process or a second mapping process is then selected. The first mapping process comprises mapping an indicator to a first dispensing process to dispense printing material from the dispenser to produce content according to a content characteristic of the printing content at a given location, and the second mapping process comprises mapping the indicator to a second dispensing process to dispense printing material to produce content according to the content characteristic at the given location. The first dispensing process is different than the second dispensing process. The indicator represents the content characteristic. The method also comprises performing the selected mapping process.

11 Claims, 7 Drawing Sheets

(51) Int. Cl.
  *H04N 1/00*      (2006.01)
  *H04N 1/60*      (2006.01)
(52) U.S. Cl.
  CPC ..... *G06K 15/1823* (2013.01); *H04N 1/00005*
      (2013.01); *H04N 1/60* (2013.01)

(56) References Cited

U.S. PATENT DOCUMENTS

| | | |
|---|---|---|
| 6,809,833 B1 | 10/2004 | Blair et al. |
| 7,237,866 B2* | 7/2007 | Yamazaki ............ B41J 2/17566 |
| | | 347/21 |
| 7,491,424 B2 | 2/2009 | Hersch et al. |
| 2004/0042021 A1 | 3/2004 | Wu et al. |
| 2005/0146543 A1 | 7/2005 | Smith et al. |
| 2005/0259295 A1* | 11/2005 | Nagao ................... G06K 15/00 |
| | | 358/2.1 |
| 2007/0273917 A1 | 11/2007 | Encrenas et al. |
| 2008/0259126 A1 | 10/2008 | Otis |
| 2009/0016776 A1 | 1/2009 | Priebe et al. |
| 2009/0213434 A1 | 8/2009 | Ito et al. |
| 2011/0164286 A1 | 7/2011 | Silverbrook et al. |
| 2015/0202883 A1* | 7/2015 | Kojima ................ H04N 1/6097 |
| | | 347/14 |
| 2016/0037017 A1* | 2/2016 | Morovic ............ H04N 1/32309 |
| | | 358/3.28 |
| 2016/0173732 A1* | 6/2016 | Garcia Reyero Vinas ................... |
| | | H04N 1/6019 |
| | | 386/278 |
| 2017/0048420 A1* | 2/2017 | Morovic ............. H04N 1/6019 |
| 2017/0214821 A1* | 7/2017 | Morovic ............ H04N 1/32309 |
| 2017/0331979 A1* | 11/2017 | Morovic ............ H04N 1/40075 |

* cited by examiner

| | |
|---|---|
| RGB value 1 | NPac vector 1 = [index_1, ac_1; index_2, ac_2; ... index_y, ac_y] |
| RGB value 2 | NPac vector 2 = [index_1, ac_1; index_2, ac_2; ... index_y, ac_y] |
| ...... | ............ |
| RGB value x | NPac vector x = [index_1, ac_1; index_2, ac_2; ... index_y, ac_y] |

| Index_1 | NP_1 = [ 1 0 0 0 0 0 0 0 0 0 0] |
| Index_2 | NP_2 = [ 0 1 0 0 0 0 0 0 0 0 0] |
| ⋮ | ⋮ |
| Index_i | NP_i = [ 1 1 1 0 0 0 0 0 0 0 0] |
| ⋮ | ⋮ |

408

| Index_1 | NP_1 = [ 1 0 0 0 0 0 0 0 0 0 0] |
| Index_2 | NP_2 = [ 0 1 0 0 0 0 0 0 0 0 0] |
| ⋮ | ⋮ |
| Index_i | NP_i = [ 1 1 1 0 0 0 0 0 0 0 0] |
| ⋮ | ⋮ |

410

| Index_1 | NP_1 = [ 1 0 0 0 0 0 0 0 0 0 0] |
| Index_2 | NP_2 = [ 0 1 0 0 0 0 0 0 0 0 0] |
| ⋮ | ⋮ |
| Index_i | NP_i = [ 1 0 0 0 0 1 0 0 0 1 0] |
| ⋮ | ⋮ |

Figure 4b

DISPENSING PROCESS

BACKGROUND

In some printers, printing material is dispensed from a nozzle so as to produce printing content. Different printing content may be produced by using different dispensing processes.

BRIEF DESCRIPTION OF THE DRAWINGS

FIG. 3 illustrates a table indicating printing data;

FIG. 4b illustrates a set of tables used in mapping processes used in an example.

DETAILED DESCRIPTION

In the following description, for purposes of explanation, numerous specific details of certain examples are set forth. Reference in the specification to "an example" or similar language means that a particular feature, structure, or characteristic described in connection with the example is included in that one example, but not necessarily in other examples.

Figure 1:
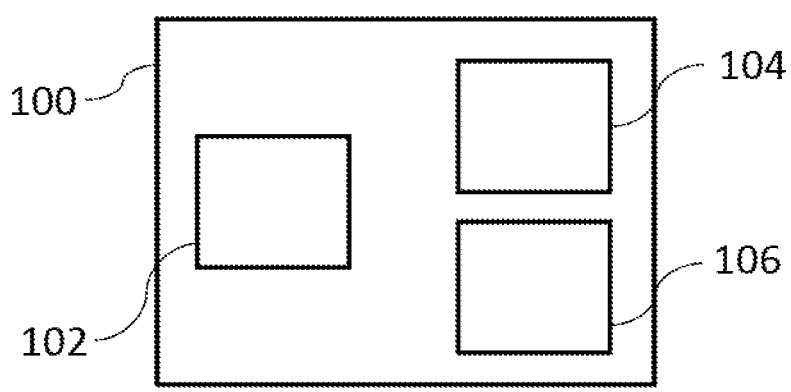
FIG. 1 is a schematic diagram of a printing system according to an example.

FIG. 1 schematically illustrates a printing system 100. The printing system 100 may comprise a controller 102, a data storage unit 104 and a dispenser 106 to dispense printing material. The controller 102 may be in data communication with the data storage unit 104. The controller 102 may be a processing unit arranged to execute instructions, for example computer programs, stored in the storage unit 104. The storage unit 104 may, for example, be a non-transitory computer readable storage medium such as a Read Only Memory (ROM) or Random Access Memory (RAM). The printing system 100 may be connected to an external device (not shown) such as a computing device by means of a data cable and/or a wireless connection. The computing device may be, for example, a laptop or desktop computer, a tablet computer, a PDA, a mobile phone, a USB thumb drive or portable hard drive. The printing system 100 may be provided with a user interface in order for a user to provide instructions to the printing system 100.

The printing system 100 (hereinafter "printer 100") may, for example, be a 2 dimensional (2D) printer to print printing content by dispensing printing material onto printing media such as paper or card, or any other media suitable for printing. The printer 100 may, for example, be an ink-jet printer or a laser printer. In the example of a 2D printer, the printing material dispensed from a dispenser (hereinafter "nozzle") may be ink, toner, wax or the like. In other examples, the printer 100 may be a three dimensional (3D) printer which prints/produces three dimensional objects from, for example, 3D model data using an additive manufacturing process. The 3D printer may use additive manufacturing processes such as laser sintering, fused deposition modelling, stereolithography, or any other manufacturing process to print 3D objects. In the example of the printer 100 being a 3D printer, the printer 100 may use a polymer, resin, or any other suitable material as printing material, and the printing material may be in the form of a build material such as a fluid or a powder, for example.

The printer 100 may receive printing instructions from the external device described above. On receipt, the processing unit 102 may cause the printer 100 to operate in accordance with the received printing instructions.

Figure 2A:
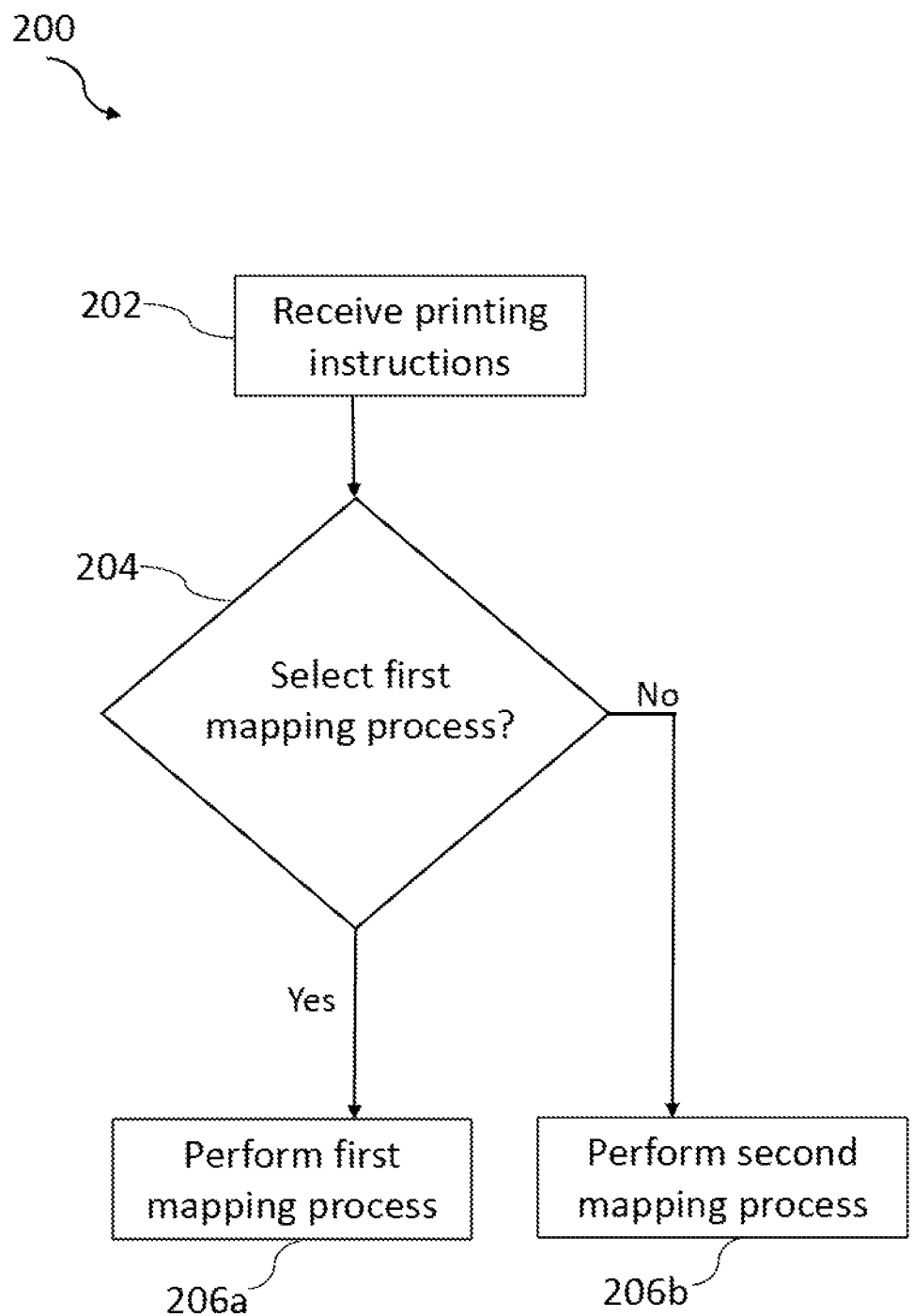
FIG. 2a is a flow diagram of a first method according to an example.

FIG. 2a illustrates an example of a first method performed by the printer 100. The method illustrated in FIG. 2a may be performed by the processing unit 102 of printer 100 in accordance with instructions stored in the data storage unit 104. However, for conciseness, the following descriptions will make reference to the printer 100 performing the steps of methods described.

At 202, printing instructions are received at the printer 100 from, for example, the external device described above through a data cable or via a wireless connection. The printing instructions represent content to be printed by the printer 100.

At 204, the printer 100 determines whether to select a first mapping process. If the determination is to perform the first mapping process, the printer 100 performs the first mapping process at 206a. If the determination is not to perform the first mapping process, the printer performs the second mapping process at 206b. Each mapping process may map an indicator to a particular dispensing process. In one example, the first mapping process comprises mapping the indicator to a first dispensing process to dispense printing material from a nozzle to produce content according to a content characteristic of the printing content at a given location, and the second mapping process comprises mapping the indicator to a second dispensing process to dispense printing material to produce content according to the content characteristic at the given location. The indicator represents the content characteristic at the given location.

Thus, the printer 100 may select either a first or second mapping processing at 204. The selection may be made in response to determining a condition of the printer 100. The printer 100 may select either the first or second mapping process in response to determining a type of the printing content to be printed. Examples of the selection of a mapping process will be explained in further detail below.

In some examples, the printer 100 comprises a plurality of nozzles, and the dispensing processes comprise dispensing printing material from the plurality of nozzles to produce content according to the content characteristic represented by the indicator at the printing location. For example, each dispensing process may comprise dispensing printing ink according to a distribution of the nozzles.

In some examples, the received printing instructions may comprise an indicator representing a content characteristic of the printing content at a given location. In some examples, however, the printer 100 may derive, from the received printing instructions, printing data indicating a content characteristic of the printing content at a given location. A content characteristic is a visual or other characteristic of content formed from printing material dispensed by the printer according to a dispensing process. An example of a content characteristic is a color (resulting from, for example, a particular combination of inks) to be printed at a given location of the printing media. Another example of a content characteristic may be the type of ink to be dropped at a given location. For example, the type of ink may be glossy ink or matte ink. Given locations at which printing content is to be printed are referred to herein as printing locations. Each printing location may, for example, be a location on the printing media, such as a pixel. The printer 100 may also receive instructions indicating other characteristics of the printing content to be printed such as, for example, the resolution at which the printing content is to be printed. The content may for example, be plain text or an image.

In some examples, the printer 100 may assign an indicator representing the content characteristic. Each indicator may be, intended to map to a dispensing process, according to which printing material (for example, ink) can be dispensed to produce content according to the content characteristic at a given location.

Figure 2B:
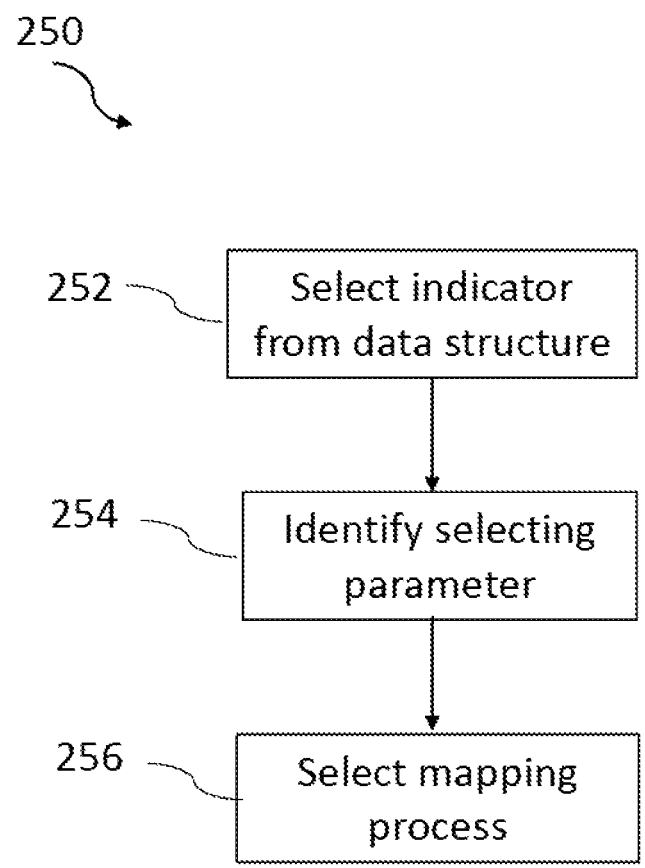
FIG. 2b is a flow diagram of a second method according to an example.

FIG. 2b illustrates an example of a second method 250 performed by the printer 100. The method illustrated in FIG. 2b may be performed by the processing unit 102 of printer 100 in accordance with instructions stored in the data storage unit 104. However, for conciseness, the following descriptions will make reference to the printer 100 performing the steps of methods described.

At 252, the printer 100 selects an indicator from a data structure. The data structure represents content to be printed by the printing system at a printing location in a given area. The data structure comprises a plurality of indicators and a corresponding plurality of area coverage values each indicating a proportion of the given area to be printed according to a content characteristic represented by a corresponding indicator.

At 254, the printer 100 identifies a selection parameter. The selection parameter may be based on a condition of the printer 100 and/or a type of content to be printed, for example.

At 256, the printer 100 selects a mapping process based on the identified selection parameter. For example, the selection may be whether to perform the first mapping process or the second mapping process described above.

We now describe a more specific example in which the printer 100 is a 2D printer, and the printer 100 receives printing instructions comprising a set of RGB values, each RGB value representing a color to be printed at a given area of the printing media.

The printer 100 may assign a data structure such as a Neugebauer Primary Area Coverage (NPac) vector to each RGB value using, for example an RGB to NPac vector look-up table (LUT) such as that shown in FIG. 3. An NPac vector comprises Neugebauer Primaries and corresponding relative area coverage values. Each NP specifies a set of respective amounts of printing material to be dispensed from a set of nozzles. For example, if a bi-level CMYK printer comprises four nozzles, each nozzle arranged to dispense one of C=cyan, M=magenta, Y=yellow and K=black ink, one particular NP may specify, for example, dispensing a drop of cyan ink and a drop of yellow ink. Each nozzle of a bi-level printer may either drop no ink, or a single amount of ink (single ink level) at a given location. An NP may exists for each combination of ink amounts and nozzles.

Figure 4A:
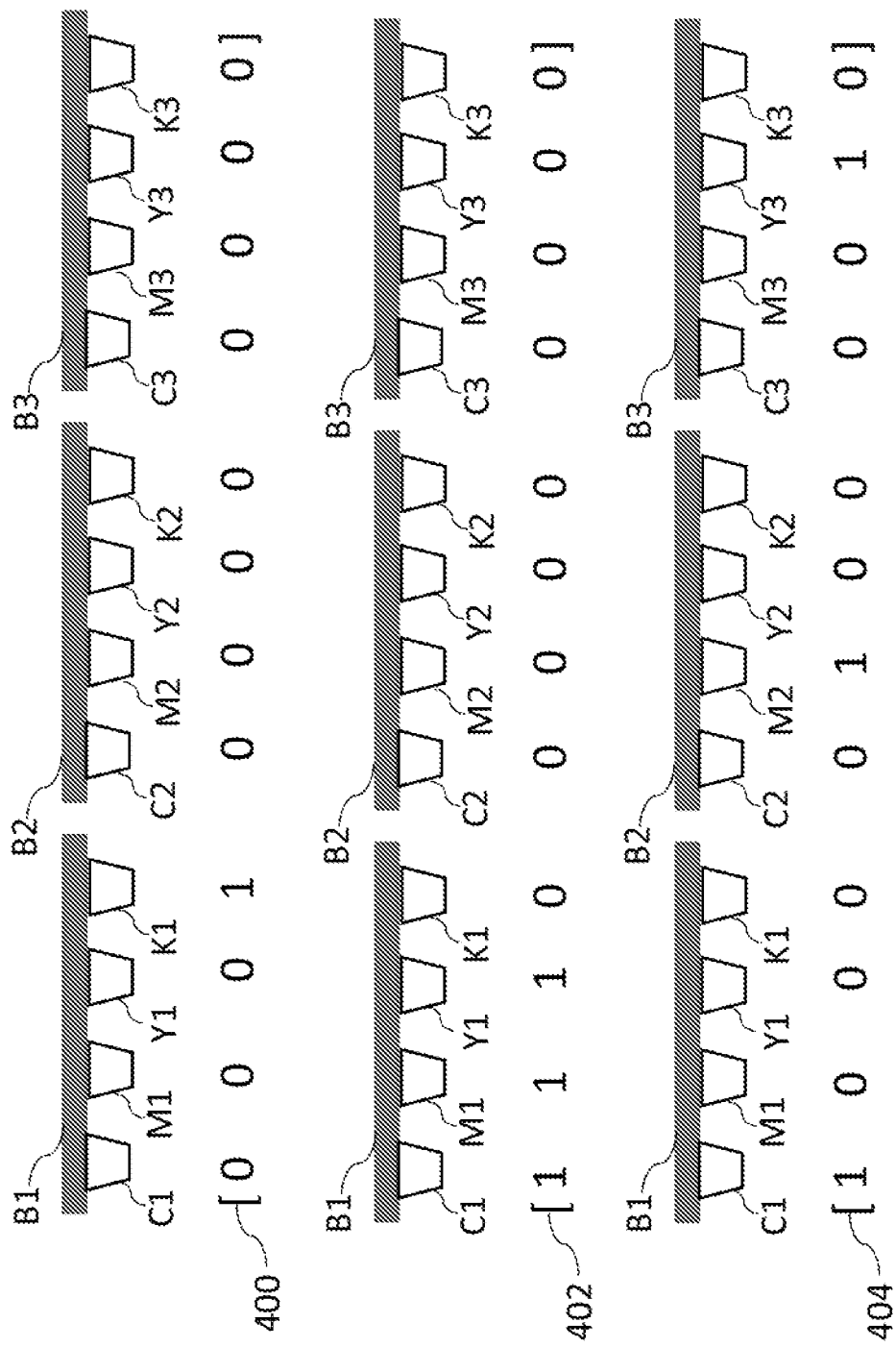
FIG. 4a illustrates a first set of dispensing processes according to an example.
Figure 4C:
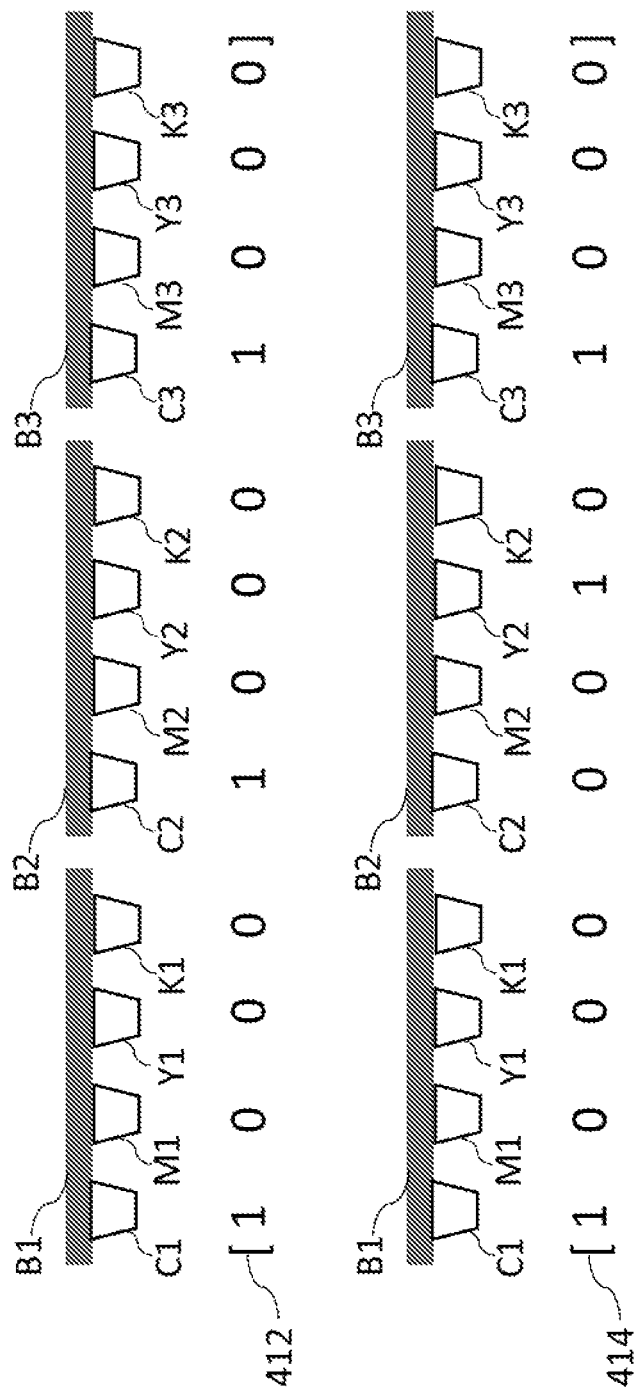
FIG. 4c illustrates a second set of dispensing processes used in an example.

In the above described bi-level CMYK printer, an NP may, for example, be represented by a series of zeros and/or ones, the order of the zeros and/or ones corresponding to the order of the respective ink colors to which they correspond in the acronym CMYK. Zeros may represent no ink being dispensed and ones may represent an amount of ink being dispensed. For example, an NP specifying an amount of cyan ink being dispensed from the cyan nozzle and no ink being dispensed from any other nozzle may be represented as [1 0 0 0], an NP specifying an amount of magenta ink from the magenta nozzle and an amount of black ink from the black nozzle being dispensed may be represented by [0 1 0 1], and so on. In other examples, the printer 100 may comprise multiple bars, each bar comprising four nozzles, each nozzle arranged to dispense one of cyan, magenta, yellow and black ink. In a 3-bar printer, an NP may, for example, be represented by a series of 12 zeros and/or ones. For example, a series of zeros and/or ones may be used to specify which nozzles are to dispense ink in a particular dispensing process (zeros representing no ink and ones representing a given amount of ink to be dispensed) as shown in FIGS. 4a-4c. In these examples, the digits at positions one to four correspond to the cyan C1, magenta M1, yellow Y1 and black K1 nozzles respectively of the first bar B1, the digits at positions five to eight correspond to the cyan C2, magenta M2, yellow Y2 and black K2 nozzles respectively of the second bar B2, and the digits at positions nine to twelve correspond to the cyan C3, magenta M3, yellow Y3 and black K3 nozzles respectively of the third bar B3. Hereinafter, example methods are described in the context of a 3-bar page wide array printer; however it will be appreciated that other types of printers may be used, for example, an ink-jet printer comprising a single bar with a cyan, magenta, yellow and black nozzle, or a 3D printer.

As mentioned above, the NPac vector for each RGB value in the received printing instructions may be determined using an RGB to NPac LUT. In some examples, the RGB to NPac LUT may not contain an exhaustive list of all RGB values and corresponding NPac vectors; in these examples, an interpolation or other process may be performed in order to determine NPac vectors for RGB values which are not listed.

FIG. 3 illustrates some example entries contained in the RGB to NPac LUT. As shown, each RGB value entry corresponds to an NPac vector. The NPac vectors may comprise indices corresponding to NPs. In other words, the indices index_1, index_2 etc. may be indicators that can be mapped to NPs. For example, index_1 may correspond to a first NP, index-2 may correspond to a second NP and so on. As shown, the NPac vectors may also comprise area coverage values indicated by ac_1, ac_2 etc. corresponding to respective indices. The indices may, for example, be 8-bit values. The indices are examples of the indicators representing a content characteristic (in this example, a color) mentioned above.

As mentioned above, an RGB value may represent a given color to be printed in a given area of the printing media. The given area of the printing media, for example, may be an area, comprising multiple pixels, where a given color is to appear. A printing material dispensing pattern may be determined which specifies a distribution of printing pixels where respective inks may be dropped in order to produce the given color in the given area. The distribution of printing pixels where respective inks are to be dropped may include all or not all of the pixels within the given area. To produce the given color, the ink dispensing pattern may specify different inks to be dropped at different printing pixels, or the same ink may be dropped. For example, a halftoning technique may be used in order to determine the ink dispensing pattern (referred to as a dispensing pattern). Any suitable halftoning technique such as parallel random weighted area coverage selection (PARAWACS) and error diffusion may be used, for example.

For a pixel where ink is to be dropped, an index from the NPac vector corresponding to the RGB value representing the given color may be selected. The area coverage values corresponding to indices in the NPac vector may, for example, represent probabilities of their respective indices being selected. Therefore, an index may be selected in accordance with the probability of selection that corresponding area coverage value represents. For printing pixels where no ink is to be dropped, an index which maps to an NP specifying no ink be dropped may be assigned. Thus an index may be assigned to the content characteristic of each printing pixel (spatial location) on a printing media. Alternatively, an index may only be assigned to content characteristics of those printing pixels where ink is to be dropped according to the dispensing pattern.

As mentioned above, the printer 100 may select either a first or a second mapping process in response to determining a condition of the printer 100. The determination of the condition may be based on input from sensors, for example sensors which detect an operation condition of a nozzle. In some examples, the condition of the printer 100 may be determined by the printer 100 itself or by an external device. In some examples, a condition of the printer 100 may be specified by a user.

The printer 100 may determine whether the printer 100 is in a first condition or a second condition. The first condition may be a normal running condition of the printer 100 (for example, all nozzles operating normally), whereas the second condition may be an abnormal running condition (failure of a nozzle, for example).

If it is determined that the printer 100 is in a first condition, the printer 100 selects a first mapping process at 204. The first mapping process may map the assigned index to a first dispensing process at 206a that makes use of all nozzles, for example. On the other hand, if it is determined that the printer 100 is in a second condition, the printer 100 selects a second mapping process at 204. If the second condition, for example, is an abnormal condition in which a particular nozzle of the printer 100 has failed, the second mapping process may map the assigned index to a second dispensing process at 206b that does not include the use of the failed nozzle to dispense ink.

The assigned index may, for example, be mapped to a dispensing process by way of being mapped to an NP that specifies that dispensing process. Therefore, if a first mapping process is selected, the assigned index may be mapped to a first NP that specifies a first dispensing process which may make use of all printer nozzles. If a second mapping process is selected, the assigned index may be mapped to a second NP that specifies a second dispensing process which may not make use of the failed nozzle. Each dispensing process may be selected such that ink is dispensed, at the printing pixel to which the index is assigned, to produce printing content according to the RGB value in the area where that content is to appear. In other words, each dispensing process may produce printing content having substantially the same characteristic; the extent to which the characteristics conform to the received printing instructions may depend on factors such as the exact condition of the printer, the range of colors available for printing and so on.

The assigned index may, for example, be mapped to a dispensing process according to the selected mapping process through use of an index to NP LUT. A "normal" index to NP LUT may, for example, be stored in the data storage unit 104 intended to be used if the printer 100 is in a normal operating condition. The data storage unit 104 may also store alternative pre-generated index to NP LUTs intended to be used if the printer 100 is in an abnormal operating condition such that the "normal" index cannot be used. For example, an alternative index to NP LUT intended to be used when a particular black ink nozzle of the printer 100 fails may be stored. Alternatively or additionally, alternative LUTs may be dynamically generated when an abnormal operating condition is detected. For example, if one of the black ink nozzles fails, an alternative index to NP LUT may be generated wherein none of the indices are mapped to NPs that specify the use of that particular black ink nozzle.

For example, if index_i, which may be intended to be mapped to the NP specifying ink to be dropped by the nozzle K1 of the first bar B1 is assigned to a content characteristic at a given printing pixel, and the printer 100 is determined to be in a first condition indicating normal running conditions of the printer 100, the first mapping process may map the assigned index to a first dispensing process specified by the NP 400 of FIG. 4a. This mapping of the assigned index to NP 400 may be performed using an index to NP LUT such as the index to NP LUT 406 shown in FIG. 4b. In LUT 406, index j, which is the assigned index is mapped to NP 400 which specifies that nozzle K1 is to drop ink, and thus content according to the printing instructions for the area encompassing the printing pixel can be produced. The index to NP LUT 406 is therefore a LUT intended to be used in normal running conditions of the printer 100.

If on the other hand, the printer 100 is determined to be in a second condition (abnormal running condition) in which nozzle K1 has failed, the second mapping process may comprise mapping the index_i to a second dispensing process specified by the NP 402 of FIG. 4a. The NP 402 specifies that nozzles C1, M1 and Y1 are to drop ink, and thus content according to the printing instructions for the area encompassing the printing pixel can be produced. The effect of the color black may be given by using cyan magenta and yellow ink together, for example. For this second mapping, the index to NP LUT 408 of FIG. 4b may be used which does not map indices to NPs that specify the use of nozzle K1. For example, the LUT 408 maps index_i to NP 402 rather that 400, and is an index to NP LUT intended to be used in abnormal running conditions of the printer 100.

In another example, the second mapping process may comprise mapping the index_i to a second dispensing process specified by the NP 404 of FIG. 4a. NP 404 NP specifies the use of cyan, magenta and yellow nozzles from the first bar B1, second bar B2 and the third bar B3 respectively in contrast to NP 402 which specifies use of nozzles from the same bar, namely the first bar B1. NP 404 may be chosen, for example, if a balanced use of bars is desired. The index to NP LUT 410, which maps index_i to NP 404, may be used for this second mapping.

As mentioned above, the printer 100 may select a mapping process based on a type of the printing content to be printed by the printer 100. In some examples, the received printing instructions may indicate the type of content to be printed. The type of printing content may be detected by the printer 100 or it may be indicated by the user, for example. Examples of different types of content include color image, black and white image, plain text etc.

If it is determined that the content to be printed is a first type of content (e.g. a color image), a first mapping process may be selected to map to a dispensing process in which nozzles from all bars of the printer 100 are used to dispense ink, for example. On the other hand, if it is determined that the type of content to be printed is a second type of content, namely plain text in black, a second mapping process may be selected to map to a second dispensing process in which the black ink nozzle from only one of the three bars of the printer 100 to dispense ink rather than making use of black ink nozzles from multiple bars. The use of multiple print bars may thus be avoided in order to avoid unwanted artefacts such as, for example, accumulated cross-bar drop placement error (DPE).

As in the example described above of the printer 100 determining a condition of the printer 100, the assigned index may be mapped to a dispensing process by way of being mapped to an NP that specifies that dispensing process. The assigned index may be mapped to a dispensing process according to the selected mapping process using either a previously generated index to NP LUT stored in the data storage unit 104, or an index to NP LUT may be dynamically generated that maps the assigned index to the appropriate dispensing process.

In some examples, the selection of a mapping process may be based on both a condition of the printer 100 and a type of the printing content. For example, the type of content to be printed may first be determined, and subsequently, a condition of the printer 100 may be determined in order to select an appropriate mapping process. In other examples, the mapping process may be selected based on different criteria.

Example methods described herein enable the dispensing process to be used for printing to be determined based on a condition of the printer and/or a type of content to be printed and/or other criteria allowed for by the use of an indicator that can be mapped to different dispensing processes. Adjustments may therefore be made without requiring that other processes are affected. Adjustments to be made may also be dynamically determined. For example, adjustments may be made without changes to an RGB to NPac LUT. Thus computationally expensive to manage resources such as, for example, RGB to NPac LUTs may be addressed a reduced number of times while making adjustments to dispensing processes. In some examples, it may be computationally less expensive to maintain and/or dynamically generate indicator to NP LUTs (as these may be significantly smaller and simpler) than it may be to apply changes to, or provide extra entries in, the RGB to NPac LUT to take account of conditions in a printer and/or the type of printing content.

Although in the above example, nozzle failure is used as an example of an undesirable condition in a printer, it will be appreciated the above methods may take account of other abnormal conditions in a printer.

As mentioned above, in some examples the printer 100 may be a 3D printer. In this case, indicators assigned to a content characteristic at a given voxel may be mapped to device states such as material vectors (Mvecs) to achieve similar benefits to those described above. In 3D printing, content characteristics other than the printing materials and their respective amounts may be considered. For example, if a nozzle of a given printing material with specific fusing properties fails, indicators may be mapped to a dispensing process utilising a combination of other nozzles that together replicate the fusing properties of the printing material the failed nozzle should dispense. Other examples of a content characteristic include density, elasticity, conductivity and/or translucency of the printing material.

Although in the above examples a selection was made between a first or a second mapping process, in some examples a selection is made between three or more mapping processes.

It is to be understood that any feature described in relation to any one example may be used alone, or in combination with other features described, and may also be used in combination with any feature of any other of the examples, or any combination of any other of the examples. Furthermore, equivalents and modifications not described above may also be employed without departing from the scope of the accompanying claims.

What is claimed is:

1. A method comprising:
   receiving printing instructions representing printing content to be printed by a printing system, the printing system comprising a dispenser to dispense printing material;
   selecting whether to perform a first mapping process or a second mapping process in response to determining a condition of the printing system, the first mapping process comprising mapping an indicator to a first dispensing process to dispense printing material from the dispenser to produce content according to a content characteristic of the printing content at a given location, and the second mapping process comprising mapping the indicator to a second dispensing process to dispense printing material to produce content according to the content characteristic at the given location, the first dispensing process being different than the second dispensing process, the indicator representing the content characteristic; and
   performing the selected mapping process, wherein the selected mapping process comprises generating a look-up table in response to the condition of the printing system and using the generated look-up table to map the indicator to a respective dispensing process.

2. A method according to claim 1, comprising:
   deriving, from the received printing instructions, printing data indicating the content characteristic of the printing content at the given location; and
   assigning the indicator to the content characteristic.

3. A method according to claim 1, wherein the condition comprises a condition of the dispenser.

4. A method according to claim 1, comprising selecting the first or the second mapping process in response to determining a type of the printing content.

5. A method according to claim 1, wherein the first mapping process comprises mapping the indicator to a first Neugebauer Primary, and the second mapping process comprises mapping the indicator to a second, different, Neugebauer Primary.

6. A method according to claim 1, wherein the printing instructions comprise an RGB or CMYK value of the printing content for an area including the given location, and the method comprises:
   determining a Neugebauer Primary Area Coverage vector for the RGB or CMYK value, the Neugebauer Primary Area Coverage vector comprising a plurality of indicators, the indicator being one of the plurality of indicators.

7. A non-transitory computer-readable storage medium storing instructions that, when executed by a processor of a printing system, cause the processor to perform a method, the method comprising:
   selecting, from a data structure representing content to be printed by the printing system, a first indicator for printing at a printing location in a given area, the data structure comprising a plurality of indicators and a corresponding plurality of area coverage values, the plurality of indicators each representing a content characteristic, the plurality of area coverage values each indicating a proportion of the given area to be printed according to a content characteristic represented by a corresponding indicator, the first indicator representing a first content characteristic;
   identifying a selection parameter, wherein the selection parameter comprises a condition of the printing system; and selecting, based on the identified selection parameter, whether to perform a first mapping process or a second mapping process, the first mapping process comprising mapping the first indicator to a first dispensing process to dispense printing material from a dispenser of the printing system to produce content according to the first content characteristic at the printing location, and the second mapping process comprising mapping the indicator to a second dispensing process to dispense printing material to produce content according to the first content characteristic at the printing location, the first dispensing process being different than the second dispensing process;

wherein at least one of the first mapping process and the second mapping process comprises generating a look-up table in response to the condition of the printing system and using the generated look-up table to map the indicator to a respective dispensing system.

8. A printing apparatus, comprising;

a plurality of dispensers to dispense printing material to produce printing content; and a controller to:

select a first mapping process or a second mapping process in response to determining a condition of the printing system and/or a type of the printing content, the first mapping process comprising mapping an indicator to a first dispensing process to dispense printing material from the plurality of dispensers to produce content according to a content characteristic of the printing content at a given location, and the second mapping process comprising mapping the indicator to a second dispensing process to dispense printing material from the plurality of dispensers to produce content according to the content characteristic at the given location, the first dispensing process being different than the second dispensing process, the indicator representing the content characteristic; and perform the selected mapping process, wherein the selected mapping process comprises generating a look-up table in response to the condition of the printing system and using the generated look-up table to map the indicator to a respective dispensing process.

9. A printing apparatus according to claim 8, wherein the first dispensing process comprises dispensing printing material according to a first distribution of the dispensers and the second dispensing process comprises dispensing printing material according to a second, different, distribution of the dispensers.

10. A printing apparatus according to claim 9, comprising a 2D printer, wherein the content characteristic comprises a color characteristic.

11. A printing apparatus according to claim 9, comprising a 3D printer, wherein the content characteristic comprises a fusing property.

* * * * *